(12) United States Patent
Calabrese

(10) Patent No.: US 9,019,144 B2
(45) Date of Patent: Apr. 28, 2015

(54) ACQUISITION OF SAR IMAGES FOR COMPUTING A HEIGHT OR A DIGITAL ELEVATION MODEL BY INTERFEROMETRIC PROCESSING

(75) Inventor: Diego Calabrese, Rome (IT)

(73) Assignee: Thales Alenia Space Italia S.p.A., Rome (IT)

(*) Notice: Subject to any disclaimer, the term of this patent is extended or adjusted under 35 U.S.C. 154(b) by 344 days.

(21) Appl. No.: 13/523,200

(22) Filed: Jun. 14, 2012

(65) Prior Publication Data

US 2012/0319892 A1 Dec. 20, 2012

(30) Foreign Application Priority Data

Jun. 15, 2011 (IT) ................ TO2011A0526

(51) Int. Cl.
*G01S 13/00* (2006.01)
*G01S 13/90* (2006.01)

(52) U.S. Cl.
CPC .................... *G01S 13/9023* (2013.01)

(58) Field of Classification Search
CPC ........................ G01S 13/90–13/9094
USPC ....... 342/25 R, 25 A, 25 B, 25 C, 25 D, 25 E, 342/25 F, 120, 123, 156
See application file for complete search history.

(56) References Cited

U.S. PATENT DOCUMENTS

| | | | |
|---|---|---|---|
| 4,321,601 A * | 3/1982 | Richman ..................... | 342/25 C |
| 4,922,254 A * | 5/1990 | Schuessler et al. ......... | 342/25 F |
| 4,975,704 A * | 12/1990 | Gabriel et al. .............. | 342/25 C |
| 5,245,347 A * | 9/1993 | Bonta et al. .................... | 342/149 |
| 5,659,318 A * | 8/1997 | Madsen et al. ............... | 342/25 C |
| 5,818,383 A * | 10/1998 | Stockburger et al. ......... | 342/109 |
| 5,831,563 A * | 11/1998 | Barnes et al. .................. | 342/123 |
| 6,150,972 A * | 11/2000 | Bickel et al. ................ | 342/25 C |
| 6,424,287 B1 * | 7/2002 | Doerry et al. ............... | 342/25 R |
| 6,608,585 B2 * | 8/2003 | Benitz .......................... | 342/25 R |
| 6,677,884 B2 * | 1/2004 | Moreira et al. ............. | 342/25 R |
| 6,781,541 B1 * | 8/2004 | Cho ............................ | 342/25 D |
| 6,864,828 B1 * | 3/2005 | Golubiewski et al. ...... | 342/25 C |
| 6,894,637 B2 * | 5/2005 | Moreira et al. ................. | 342/22 |
| 7,142,149 B2 * | 11/2006 | Hansen ........................ | 342/25 R |
| 7,446,705 B1 * | 11/2008 | Feigl et al. ............... | 342/357.27 |
| 2003/0122700 A1 * | 7/2003 | Moreira et al. ................. | 342/25 |
| 2005/0057391 A1 * | 3/2005 | Forsley et al. .............. | 342/25 A |

(Continued)

OTHER PUBLICATIONS

Frasier, et al., Dual-Beam Interferometry for Ocean Surface Current Vectro Mapping, IEEE Transactions on Geoscience and Remote Sensing, IEEE Service Ceter, Piscatawy, vol. 39, No. 2, Feb. 1, 2001.

(Continued)

*Primary Examiner* — Peter Bythrow
(74) *Attorney, Agent, or Firm* — McCarter & English, LLP

(57) ABSTRACT

The present invention relates to a method for acquiring SAR images for interferometric processing. The method comprises acquiring, by one or more airborne SAR sensors, SAR images of one and the same area with an acquisition geometry such that to enable interferometric processing of said SAR images. The method is characterized by an acquisition geometry in which each SAR image of the area is acquired in a respective direction of acquisition that defines a respective squint angle with respect to the direction of flight, and in which the squint angles are such that to determine a mean squint angle different from zero.

13 Claims, 9 Drawing Sheets

(56) References Cited

U.S. PATENT DOCUMENTS

2010/0207808 A1* 8/2010 Prats et al. .................. 342/25 F
2011/0298655 A1* 12/2011 Leva et al. .................. 342/25 C
2012/0133550 A1* 5/2012 Benninghofen et al. ..... 342/25 A
2012/0319893 A1* 12/2012 Yun et al. .................... 342/25 C

OTHER PUBLICATIONS

Schwabisch, et al., Technical Issues in Study on Concepts for Radar Interferometry from Satellites for Ocean and Land Applications (KoRiolis) Final Report, Apr. 1, 2002, pp. 1-34.

Rosen, et al. UAVSAR: A New NASA Airborne SAR System for Science and Techology Research, Radar, 2006, IEEE Conference on Apr. 2006, Apr. 1, 2006, pp. 22-29.

Italian Search Report for Italian Patent Application No. IT T020110526 dated Jan. 19, 2012.

Muellerschoen R. et al., Error Analysis for High Resolution Topography with Bi-static, California Institute of Technology, pp. 1-9, available at http://trs-new.jpl.nasa.gov/dspace/bitstream/2014/40143/1/06-0417.pdf, Feb. 2006.

Ferretti A. et al., InSAR Principles: Guidelines for SAR Interferometry Processing and Interpretation, European Space Agency, pp. 1-48, Feb. 2007.

* cited by examiner

ACQUISITION OF SAR IMAGES FOR COMPUTING A HEIGHT OR A DIGITAL ELEVATION MODEL BY INTERFEROMETRIC PROCESSING

TECHNICAL FIELD OF THE INVENTION

The present invention relates, in general, to interferometry based on Synthetic-Aperture Radar (SAR) and, in particular, to a SAR image acquisition method for computing a height and/or a Digital Elevation Model (DEM) by interferometric processing.

PRIOR ART

As is known, SAR interferometry exploits images of one and the same area of the surface of the Earth that are generated by SAR sensors carried on board satellite or air platforms for detecting displacements of a target present in said area (in which case, it is referred to as differential interferometry), or else for reconstructing a DEM of said area and/or determining the height of individual targets present in said area. In particular, a DEM is a representation in digital format of the distribution of the heights in an area of interest.

In the following, for the sake of description simplicity, the terminology "SAR sensor" will be used to denote a synthetic-aperture radar configured to transmit and receive radar signals in predetermined directions by an antenna.

Furthermore, in the following, once again for the sake of description simplicity, the terminology "acquiring a SAR image", or, equivalently, the terminology "acquisition of a SAR image" will be used for referring to the entire process of formation of a SAR image, which, as is known, comprises:

- transmitting, by a SAR sensor airborne by a satellite/air platform, e.g., a satellite, an aircraft, or an Unmanned Aerial Vehicle (UAV), radar signals so as to illuminate an area of interest with said radar signals;
- receiving in a predetermined direction, by said SAR sensor, the radar signals back-scattered from said area; and
- processing, by a processing unit integrated in the SAR sensor itself or connected (even remotely) to the SAR sensor, the radar signals received so as to form, i.e., generate, a SAR image of said area on the basis of the radar signals received and processed.

Moreover, in the following, the predetermined direction in which the radar signals are received by the SAR sensor will be indifferently referred to, once again for the sake of description simplicity, as "acquisition direction", "direction in which a SAR image is acquired", or "direction in which an acquisition of a SAR image is made/performed/carried out".

Currently, in order to reconstruct a DEM of an area of the surface of the Earth and/or determine the height of individual targets present in said area, two SAR images of said area are acquired, each SAR image being acquired in a direction of acquisition that is orthogonal or almost orthogonal (within, at the most, a few degrees) with respect to the direction of flight of the SAR sensor used for acquiring said SAR image and airborne by a satellite/air platform. In the following, said acquisition geometry will be referred to as "quasi-zero-Doppler geometry".

In this connection, FIG. 1 is a schematic illustration of an example of said quasi-zero-Doppler geometry. In particular, FIG. 1 shows:

- a first flight direction $\vec{d}_1$;
- a second flight direction $\vec{d}_2$ substantially parallel to the first flight direction flight $\vec{d}_1$;
- a target T whose height h is to be determined;
- a Cartesian reference system defined by three axes designated in FIG. 1, respectively, by z, x, and y, said axes x and y being mutually orthogonal and identifying a plane xy at zero height, said axis z being orthogonal to the plane xy and to the first direction of flight $\vec{d}_1$ and identifying the direction along which the height h of the target T is determined, said axis x being parallel to, and oriented in the same sense as, said first direction of flight $\vec{d}_1$,
- a first acquisition of a SAR image of the target T performed in a first acquisition position $S_1$ along the first flight direction $\vec{d}_1$, said first acquisition being carried out in a first predetermined acquisition direction that is orthogonal to the first flight direction $\vec{d}_1$ and that in FIG. 1 is identified by the segment $\overline{S_1 T}$; and
- a second acquisition of a SAR image of the target T performed in a second acquisition position $S_2$ along the second flight direction $\vec{d}_2$, said second acquisition position $S_2$ having a distance b from the first acquisition position $S_1$, which distance b in the following will be referred to as "baseline", said second acquisition being made in a second predetermined acquisition direction that is orthogonal to the second flight direction $\vec{d}_2$ and that in FIG. 1 is identified by the segment $\overline{S_2 T}$.

The segments $\overline{S_1 T}$ and $\overline{S_2 T}$ represent paths of different length. SAR interferometry is based precisely on the analysis of the correlation between the height h of the target T and the difference between the two paths $\overline{S_1 T}$ and $\overline{S_2 T}$ and, hence, between the height h of the target T and the phase difference in the two SAR images acquired.

Currently, in order to reconstruct, i.e., compute, a DEM of an area of the surface of the Earth and/or determine, i.e., compute, the height of individual targets present in said area, three main techniques are used:

1) two SAR sensors installed on board a single satellite/air platform are used for acquiring SAR images of said area simultaneously (for example, with reference to FIG. 1, the two acquisition positions $S_1$ and $S_2$ represent the positions of two distinct SAR sensors carried by a single satellite/air platform); or
2) two SAR sensors, each of which is installed on board a respective satellite/air platform, are used for acquiring SAR images of said area simultaneously (for example, with reference to FIG. 1, the two acquisition positions $S_1$ and $S_2$ represent the positions of two distinct SAR sensors carried by two distinct satellite/air platforms); or
3) a single SAR sensor installed on board a single satellite/air platform is used for acquiring SAR images of said area during successive passes of said single platform over said area (for example, with reference to FIG. 1, the two acquisition positions $S_1$ and $S_2$ represent two positions assumed by one and the same SAR sensor in two successive passes over the target T of a single satellite/air platform that carries said SAR sensor).

The first technique is complex to implement and hence entails very high costs since the baseline b between the two SAR sensors used must be of the order of tens or hundreds of meters. For example, the Shuttle Radar Topography Mission (SRTM) uses an arm for separating the two SAR sensors of approximately 60 meters.

The second technique involves the use of two platforms arranged in formation quite close to one another. The creation of two platforms of this type entails a very high cost on account of their complexity, above all in the case of satellite platforms. Examples of satellite systems capable of functioning in the aforesaid way are COSMO-SkyMed in tandem configuration (approximately one second of distance between the two satellites) and TerraSar-X tandem.

Finally, the effectiveness of the third technique is limited on account of the distance in time between two consecutive observations of one and the same area by the single SAR sensor, for example 16 days with COSMO-SkyMed and 24 days with RadarSat. Said distance in time produces a limited temporal correlation, enabling DEMs to be obtained only for areas that maintain the same electromagnetic characteristics after many days, for example volcanic areas or areas with a low level of vegetation.

Examples of techniques of acquisition of SAR images based upon quasi-zero-Doppler geometry for interferometric applications are provided in:

Paul A. Rosen et al., "*UAVSAR: A new NASA Airborne SAR System for Science and Technology Research*", IEEE Radar Conference 2006, Apr. 1, 2006, pp. 22-29 (hereinafter identified, for simplicity of description, as Ref 1);

Stephen J. Frasier et al., "*Dual-Beam Interferometry for Ocean Surface Current Vector Mapping*", IEEE Transactions on Geoscience and Remote Sensing, vol. 39, No. 2, Feb. 1, 2001 (hereinafter identified, for simplicity of description, as Ref 2);

U.S. Pat. No. 6,864,828 B1 (hereinafter identified, for simplicity of description, as Ref 3);

U.S. Pat. No. 5,818,383 A (hereinafter identified, for simplicity of description, as Ref 4);

Marcus Schwäbisch et al., "*Section 5: Technical Issues*" in "*Study on Concepts for Radar Interferometry from Satellites for Ocean (and Land) Applications (KoRIOLIs)*", FINAL REPORT, Apr. 1, 2002, pp. 1-34 (hereinafter identified, for simplicity of description, as Ref 5); and A. Ferretti et al., "*InSAR Principles: guidelines for SAR Interferometry Processing and Interpretation*", European Space Agency (ESA) Publications, TM-19, February, 2007 (hereinafter identified, for simplicity of description, as Ref 6).

In particular, Ref 1 describes a SAR system designed for acquiring, with quasi-zero-Doppler geometry, SAR images of an area of interest by means of a SAR sensor operating in L band and carried on board an air platform, said system exploiting successive passes of said air platform over said area of interest. In detail, the SAR system described in Ref 1 is designed for applications of differential interferometry.

Ref 2 describes a dual-beam interferometric system for estimation of marine currents. In particular, the system, described in Ref 2 uses two pairs of SAR sensors installed on board an air platform, in which:

a first pair of SAR sensors is used for acquiring, with quasi-zero-Doppler geometry and during a single pass of the air platform over a marine area, a first pair of SAR images of said marine area; and a second pair of SAR sensors is used for acquiring, once again with quasi-zero-Doppler geometry and during said single pass of the air platform over the marine area, a second pair of SAR images of said marine area.

Moreover, according to Ref 2, each of the two pairs of SAR images is used for respective interferometric measurements, and finally, all the interferometric measurements thus obtained are appropriately combined for estimating the surface vector velocity of the marine area.

Ref 3 describes a system and a method for collecting SAR interferometric data. In particular, according to Ref 3, two SAR sensors, each of which installed on board a respective satellite, are used for acquiring simultaneously, with quasi-zero-Doppler geometry, SAR images of an area of interest for the purpose of carrying out interferometric measurements.

Ref 4 describes a system for forming interferometric images of a moving vehicle using at least three SAR sensors installed on board an air platform. Also the system described in Ref 4 exploits quasi-zero-Doppler acquisition geometry.

Ref 5 is a tutorial on SAR interferometry by satellite for marine applications. In particular, Ref 5 describes bistatic interferometric systems that use a master satellite as illuminator in X or L band and one or more slave satellite/satellites as receiver/receivers. Also the bistatic interferometric systems described in Ref 5 exploit the quasi-zero-Doppler acquisition geometry.

Finally, Ref 6 is a tutorial on the interferometric processing of SAR images in which only quasi-zero-Doppler acquisition geometry is considered.

OBJECT AND SUMMARY OF THE INVENTION

The aim of the present invention is hence to provide a method for acquiring SAR images for interferometric processing that will be able to alleviate the disadvantages described previously.

In particular, with the present invention, the aim is to reduce the development and operating costs for generation of three-dimensional topographic maps and/or DEMs via SAR remote sensing from aircraft and/or satellite.

The aforesaid aim is achieved by the present invention in so far as it relates to a method for acquiring SAR images for interferometric processing, a method for computing a height, a method for computing a digital elevation model, a method for computing an interferogram, a method for computing a coherence map, a SAR remote sensing system configured to implement said SAR image acquisition method, a software program product for implementing said method for computing a height, a software program product for implementing said method for computing a digital elevation model, a software program product for implementing said method for computing an interferogram, and a software program product for implementing said method for computing a coherence map, according to what is defined in the annexed claims.

In particular, the method for acquiring SAR images for interferometric processing according to the present invention comprises acquiring, via one or more airborne SAR sensors, SAR images of one and the same area with an acquisition geometry such as to enable interferometric processing of said SAR images. Said SAR image-acquisition method is characterized by an acquisition geometry in which each SAR image of the area is acquired in a respective direction of acquisition that defines a respective squint angle with respect to the direction of flight, and in which the squint angles are such that to determine a mean squint angle different from zero.

Conveniently, the mean squint angle is equal to, or greater than, three degrees.

Conveniently, for each acquired SAR image, the respective direction of acquisition is obtained by:

electronically steering the directivity of the antenna of the SAR sensor used for acquiring said SAR image; and/or imposing a movement of pitch and/or yaw on said SAR sensor.

Preferably, the SAR images are acquired by only one SAR sensor that is airborne by an air/satellite platform, uses only one antenna and acquires the SAR images in only one pass of the air/satellite platform.

Conveniently, acquiring a SAR image of the area comprises:

transmitting radar signals so as to illuminate said area with said radar signals;

receiving in the respective direction of acquisition the radar signals back-scattered from said area; and processing the radar signals received so as to generate a SAR image of said area.

Moreover, the method for computing a height according to the present invention comprises computing a height of a target present in an area by an interferometric processing of SAR images of said area that are acquired by implementing the aforesaid SAR image acquisition method, said interferometric processing being based on the acquisition geometry with which said SAR images have been acquired.

The method for computing a digital elevation model according to the present invention comprises computing a digital elevation model of an area by an interferometric processing of SAR images of said area that are acquired by implementing the aforesaid SAR image acquisition method, said interferometric processing being based on the acquisition geometry with which said SAR images have been acquired.

The method for computing an interferogram according to the present invention comprises computing an interferogram on the basis of SAR images of one and the same area that are acquired by implementing the aforesaid SAR image acquisition method.

Finally, the method for computing a coherence map according to the present invention comprises computing a coherence map on the basis of SAR images of one and the same area that are acquired by implementing the aforesaid SAR image acquisition method.

BRIEF DESCRIPTION OF THE DRAWINGS

For a better understanding of the present invention, some preferred embodiments, provided purely by way of explanatory and non-limiting example, will now be illustrated with reference to the annexed drawings (not in scale), wherein.

DETAILED DESCRIPTION OF PREFERRED EMBODIMENTS OF THE INVENTION

The ensuing description is provided to enable a person skilled in the sector to implement and use the invention. Various modifications to the embodiments presented will be immediately evident to skilled persons, and the generic principles disclosed herein could be applied to other embodiments and applications without thereby departing from the scope of protection of the present invention.

Hence, the present invention is not to be understood as being limited to just the embodiments described and shown, but it must be granted the widest scope of protection consistently with the principles and characteristics presented herein and defined in the annexed claims.

Figure 1:
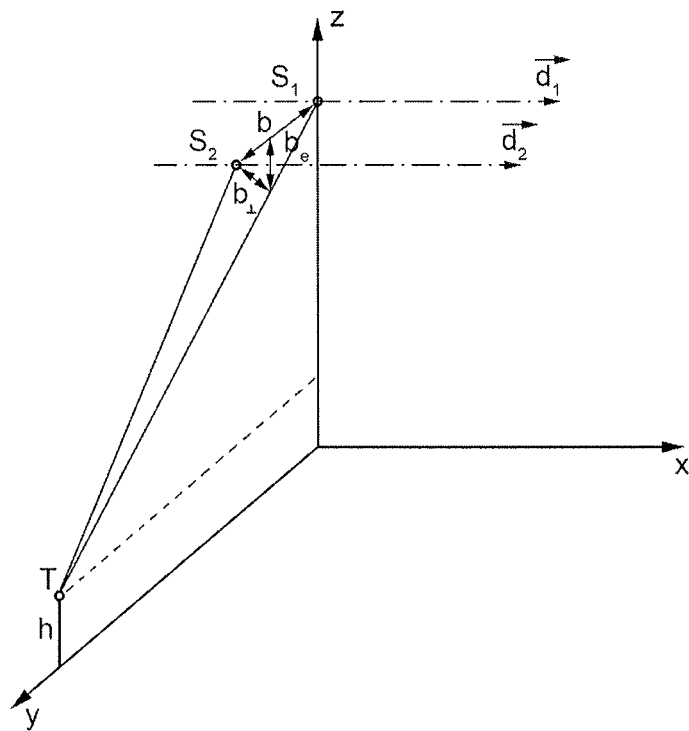
FIG. 1 is a schematic illustration of the acquisition geometry currently used for acquiring SAR images of one and the same area of the surface of the Earth in order to reconstruct a digital elevation model of said area and/or determine height of individual targets present in said area.

In the following, in order to describe in detail the present invention, the following definitions that are widely known in the sector of SAR interferometry will be used:

baseline: distance between two positions of acquisition of two SAR images of one and the same area (in FIG. 1, as previously described, the baseline b is the segment $\overline{S_1 S_2}$);

line of view: segment that joins the target and one of the two positions of acquisition that is assumed as position in which the master acquisition is made (in FIG. 1 the first position of acquisition $S_1$ is assumed as position of the master acquisition and, consequently, the line of view is the segment $\overline{S_1 T}$);

difference of path: difference between the two paths that join the target to the two positions of acquisition (in FIG. 1, as previously described, the difference of path is the difference between the two paths $\overline{S_1 T}$ and $\overline{S_2 T}$);

orthogonal baseline: component of the baseline that is perpendicular to the line of view (in FIG. 1 the orthogonal baseline is represented by the segment designated by $b_\perp$, which is orthogonal to the line of view $\overline{S_1 Y}$);

effective or interferometric baseline: component of the orthogonal baseline that is parallel to the direction along which the height of the target is measured (in FIG. 1 the effective baseline is represented by the segment designated by $b_e$ that is parallel to the axis z); the presence of an effective baseline determines a correlation between the difference of path and the height of a given target and consequently enables interferometry;

interferometric ambiguity distance: distance between two targets that, given the same height, have the same difference of path;

critical baseline: the effective baseline value for which the interferometric ambiguity distance coincides with the resolution of the SAR image;

ambiguity height: difference of height of a target that entails a difference of path equal to the wavelength of the radar signals used; and geometrical decorrelation: decorrelation caused by the fact that one and the same target is viewed from two different angles and, hence, has a different behaviour in phase.

The present invention relates to a method for acquiring SAR images for interferometric processing, specifically to a method for acquiring SAR images of one and the same area of interest with an acquisition geometry such as to enable interferometric processing of said SAR images.

Moreover, a first specific aspect of the present invention regards a method for reconstructing, i.e., computing, a DEM of an area on the basis of SAR images of said area acquired by implementing said SAR image acquisition method.

Moreover, a second specific aspect of the present invention regards a method for determining, i.e., computing, the height of a target present in an area on the basis of SAR images of said area acquired by implementing said SAR image acquisition method.

Moreover, a third specific aspect of the present invention regards a method for generating, i.e., computing, an interferogram on the basis of SAR images of one and the same area acquired by implementing said SAR image acquisition method.

Moreover, a fourth specific aspect of the present invention regards a method for generating, i.e., computing, a coherence map on the basis of SAR images of one and the same area acquired by implementing said SAR image acquisition method.

The present invention stems from the idea of the Applicant to use, for acquiring SAR images of one and the same area of interest, an acquisition geometry that is different from the quasi-zero-Doppler geometry currently used and that will be referred to hereinafter as "squinted geometry".

In particular, in said squinted geometry each SAR image is acquired in a respective direction of acquisition that is not orthogonal to the direction of flight of the SAR sensor used for acquiring said SAR image.

In detail, according to the present invention, SAR images of one and the same area of interest are acquired using squint angles such that to determine a mean squint angle different from zero so as to generate an effective baseline and, hence, so as to enable an interferometric analysis of the different SAR images acquired.

Conveniently, the mean squint angle is equal, or greater than, three degrees.

Preferably, the different SAR images are acquired using only one SAR sensor that has only one antenna, is airborne by only one satellite/air platform, and acquires said SAR images during only one pass of the satellite/air platform.

Figure 2:
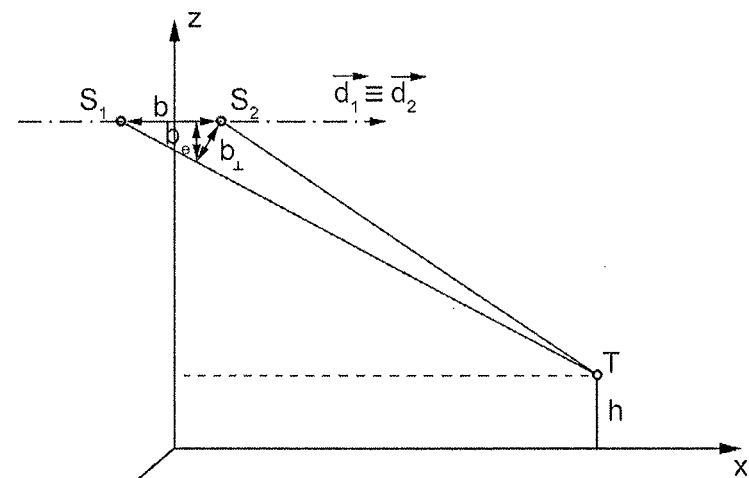
FIGS. 2 and 3 are schematic illustrations of two further acquisition geometries different from the one shown in FIG. 1.

In order to enable a better understanding of the geometry of acquisition of SAR images according to the present invention, FIG. 2 is a schematic illustration of an acquisition geometry obtained by rotating through 90° about the axis z the quasi-zero-Doppler geometry shown in FIG. 1. In particular, the acquisition geometry of FIG. 2 is obtained by displacing the target T and the baseline b of FIG. 1 in a single flight direction $\vec{d}_1 \equiv \vec{d}_2$. For reasons of symmetry, the interferometric relations of the quasi-zero-Doppler geometry of FIG. 1 remain unvaried in the acquisition geometry of FIG. 2. In particular, the effective baseline $b_e$ of the quasi-zero-Doppler geometry of FIG. 1 and of the acquisition geometry of FIG. 2 coincide. In any case, it should be noted that the acquisition geometry shown in FIG. 2 represents an absurd case in so far as a SAR sensor cannot work in such an acquisition geometry since the ground range is parallel to the azimuthal direction (axis x). Consequently, in the acquisition geometry of FIG. 2 the resolution would be possible only in a direction parallel to the axis x, whereas there would be no resolution (or in any case it would be very limited) in a direction parallel to the axis y.

Figure 3:
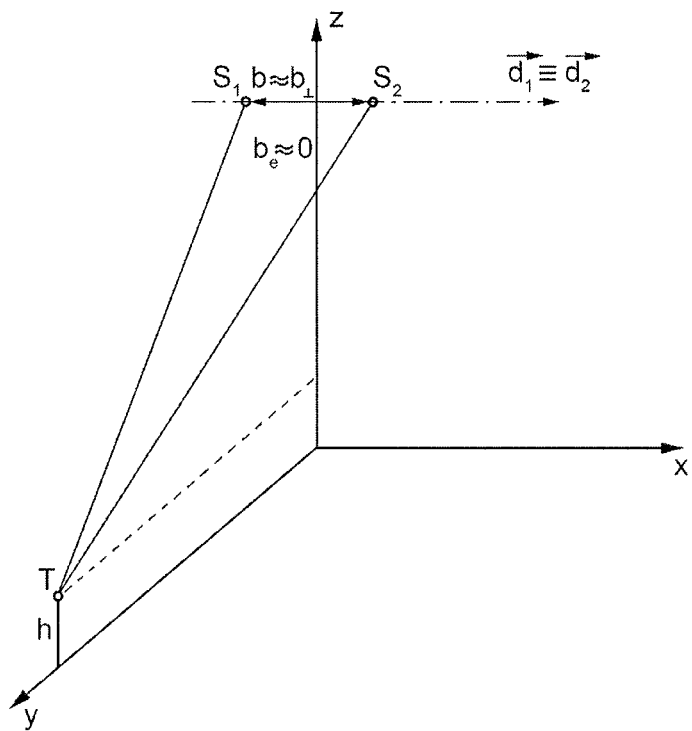

Moreover, FIG. 3 is a schematic illustration of a further acquisition geometry in which the baseline b is parallel to the single flight direction $\vec{d}_1 \equiv \vec{d}_2$ and the target T is equidistant from the two positions of acquisition $S_1$ and $S_2$. In the acquisition geometry of FIG. 3 no effective baseline $b_e$ is present. Consequently, the difference between the two paths $\overline{S_1T}$ and $\overline{S_2T}$ is not correlated to the height h of the target T observed (in fact, in this acquisition geometry said difference is equal to zero) and, hence, the phase difference in the two SAR images does not produce useful information for estimation of the height h of the target T.

Figure 4:
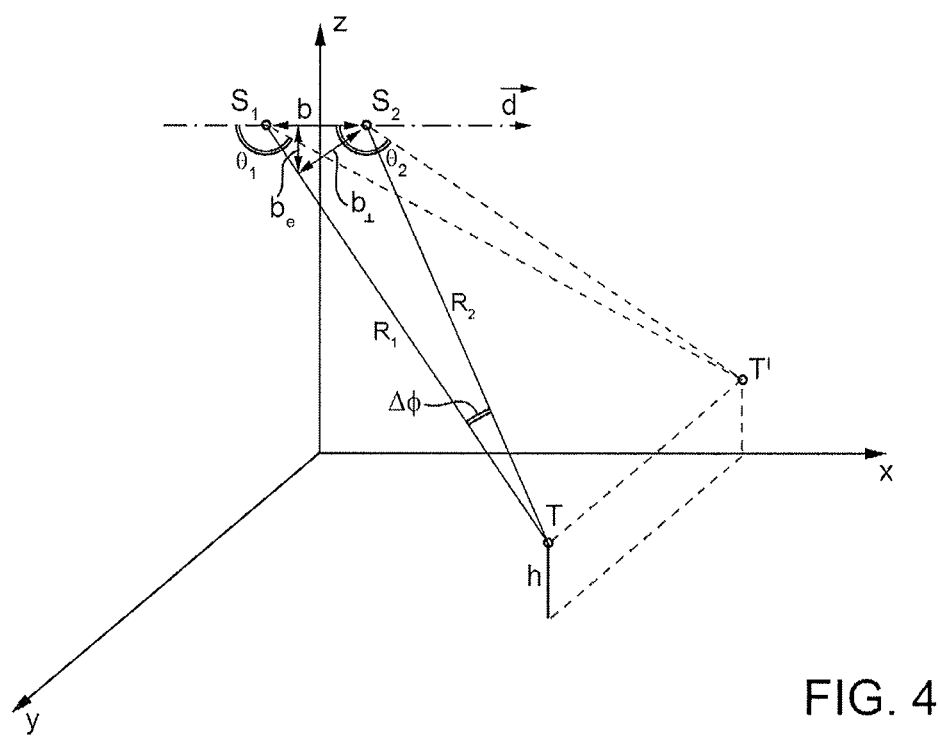
FIG. 4 is a schematic illustration of an example of the acquisition geometry used according to the present invention for acquiring SAR images of one and the same area of interest in order to reconstruct a digital elevation model of said area and/or determine height of individual targets present in said area.

Finally, FIG. 4 is a schematic illustration of an example of the squinted-geometry acquisition used, according to the present invention, for acquiring SAR images of one and the same area of interest in order to compute a DEM of said area and/or in order to compute the height of individual targets present in said area.

In particular, the squinted geometry shown in FIG. 4 represents an intermediate geometrical solution between the acquisition geometries shown in FIGS. 2 and 3. In fact, for all the intermediate positions between the two limit cases represented by the acquisition geometries shown in FIGS. 2 and 3, i.e., for pairs of squinted acquisitions having a non-zero mean value of squint, there is a non-zero value of the effective baseline and, hence, there is the possibility of carrying out interferometric processing. In other words, the squinted-geometry acquisition used by the present invention for acquiring SAR images enables an effective baseline to be obtained, thus enabling formation of interferometric images and thus enabling interferometric processing of the SAR images acquired.

In detail, FIG. 4 shows:

a flight direction $\vec{d}$;

a target T the height h of which is to be determined;

a Cartesian reference system defined by three axes designated in FIG. 4, respectively, by z, x, and y, said axes x and y being mutually orthogonal and identifying a plane xy at zero height, said axis z being orthogonal to the plane xy and to the direction of flight $\vec{d}$ and identifying the direction along which the height h of the target T is determined, said axis x being parallel to, and oriented in the same sense as, said direction of flight $\vec{d}$;

a first acquisition of a SAR image of the target T made in a first position of acquisition $S_1$ along the flight direction $\vec{d}$, said first acquisition being made in a first predetermined direction of acquisition that in FIG. 4 is identified by the segment $\overline{S_1T}$ and that forms with the flight direction $\vec{d}$, in the plane identified by said flight direction $\vec{d}$ and by the direction along which the height h of the target T is determined, i.e., in the plane zx, a first squint angle $\theta_1$ different from 90° (i.e., $\theta_1 \neq 90°$; and a second acquisition of a SAR image of the target T made in a second position of acquisition $S_2$ along the flight direction $\vec{d}$, said second position of acquisition $S_2$ having a distance of a baseline b from the first position of acquisition $S_1$, said second acquisition being made in a second predetermined direction of acquisition that in FIG. 4 is identified by the segment $\overline{S_2T}$ and that forms with the flight direction $\vec{d}$, in the plane identified by said flight direction $\vec{d}$ and by the direction along which the height h of the target T is determined, i.e., in the plane zx, a second squint angle $\theta_2$ different from 90° and from the first squint angle $\theta_1$ (that is, $\theta_2 \neq 90°$ and $\theta_2 \neq \theta_1$).

In the squinted geometry shown in FIG. 4 a first path $R_1$, i.e., the segment $\overline{S_1T}$, joins the first position of acquisition $S_1$ and the target T. As described previously, said first path $R_1$ forms with the flight direction $\vec{d}$, in the plane identified by said flight direction $\vec{d}$ and by the direction along which the height h of the target T is determined, i.e., in the plane zx, the first squint angle $\theta_1$ different from 90° (that is, $\theta_1 \neq 90°$).

Likewise, a second path $R_2$, i.e., the segment $\overline{S_2T}$, joins the second position of acquisition $S_2$ and the target T, and said second path $R_2$ forms with the flight direction $\vec{d}$, in the plane identified by said flight direction $\vec{d}$ and by the direction along which the height h of the target T is determined, i.e., in the plane zx, the second squint angle $\theta_2$ different from 90° and from the first squint angle $\theta_1$ (that is, $\theta_2 \neq 90°$ and $\theta_2 \neq \theta_1$).

Since the two acquisitions are made with two different squint angles ($\theta_2 \neq \theta_1$), i.e., with a non-zero mean squint angle, we obtain a non-zero value of the effective baseline $b_e$ and hence we have the possibility of carrying out interferometric processing. In particular, the difference between the two paths $R_1$ and $R_2$, i.e., the difference of path $\Delta R = R_1 - R_2$, corresponds to a phase difference in the two acquired SAR images on the basis of which it is possible, if the acquisition geometry, i.e., the squinted geometry, is known, to determine the height h of the target T.

When two SAR images of one and the same area are generated using two different angles of observation, the two SAR images present different behaviours in phase and, hence, there is a geometrical decorrelation between the two SAR images. Once again with reference to FIG. 4, the angle that characterizes said geometrical decorrelation is $$S_1 \hat{T} S_2 = S_2 = \Delta \phi$$

One of the hypotheses underlying the present invention is that the decorrelation is a function of the absolute value of the angle $\Delta\phi$ and not of its orientation.

In general, the geometrical decorrelation can be expressed as $$\frac{2 \cdot \Delta\phi \cdot R_{is}}{\lambda}$$

where $\lambda$ is the wavelength of the radar signals transmitted/received, and $R_{is}$ is the geometrical resolution in range of the SAR sensor used.

As described previously, the two acquisitions of SAR images of the target T are preferably made using a single SAR sensor carried by a satellite/air platform. In particular, said SAR sensor acquires the two SAR images of the target T during just one pass of the satellite/air platform over the area of interest. In any case, the aim here is to emphasize that the present invention can be implemented exploiting even two SAR sensors carried either both by a single satellite/air platform or each by a respective satellite/air platform.

Conveniently, the different squint angles used for acquiring the different SAR images of one and the same area of interest, i.e., the different squinted directions of acquisition, can be obtained by:

using an electronically steerable beam SAR antenna and electronically steering the beam of radar signals transmitted/received by the antenna of the SAR sensor; and/or imposing appropriate movements of pitch and/or yaw on the satellite/air platform on board which the SAR sensor is installed or on the portion of the satellite/air platform (for example, a mechanical arm) to which said SAR sensor is coupled.

As previously described (see, in this regard, section "Prior art"), the techniques currently used for SAR acquisitions for interferometric purposes envisage the use of the quasi-zero-Doppler geometry (illustrated in FIG. 1), or, in any case, of pairs of SAR acquisitions having the same squint angle. Quasi-zero-Doppler acquisitions, owing to their very nature, guarantee that the acquisitions themselves are made with almost identical squint angles.

The need to image areas with common azimuth angles is widely known in the literature, where frequent reference is made to the so-called "azimuth spectral overlap". In particular, in the literature there is assumed the existence, of a physical constraint whereby the absence of azimuth angular overlap causes a total incoherence between the SAR images. Said incoherence would hence render impossible any interferometric measurement. It should be noted that the geometry underlying the present invention envisages acquisitions having different squint angles and hence contemplates also the case of zero spectral overlap, a circumstance that renders it innovative with respect to the prior art.

As a further proof of what has just been said, the documents Ref 1, Ref 2, Ref 3, Ref 4, Ref 5 and Ref 6 previously presented (see, in this regard, section "Prior art") consider only geometries that envisage non-zero azimuth angular overlap.

In particular, Ref 1 specifies (see, in this regard, the first five lines of section II on page 23 of Ref 1) that: "Repeat track interferometry not only requires that the phase centers of the radar antenna locations for the individual tracks are approximately coincident, it is also essential that the antenna look directions are identical to within a fraction of the beamwidth".

Having the same "look direction" hence requires the use of one and the same squint angle for the different acquisitions, i.e., a practically total spectral overlap ("within a fraction of the beamwidth").

Ref 1, unlike the present invention, describes a system designed for obtaining interferometric acquisitions by means of repeated passes over an area of interest and, hence, for applications of differential interferometry (see, in this regard, the first five lines of the Abstract of Ref 1). Here, instead, the intention is to recall that the present invention regards all interferometric applications and contemplates also the case of single pass over an area of interest.

Even though Ref 1 cites, among the characteristics of the SAR sensor, the possibility of acquiring a number of SAR images with different squint angles, unlike the present invention, it does not envisage any interferometric measurement between the acquisitions made with different squint angles; rather, it excludes it explicitly (see, in this regard, once again the first five lines of section II on page 23 of Ref 1 previously quoted and commented upon).

Figure 5:
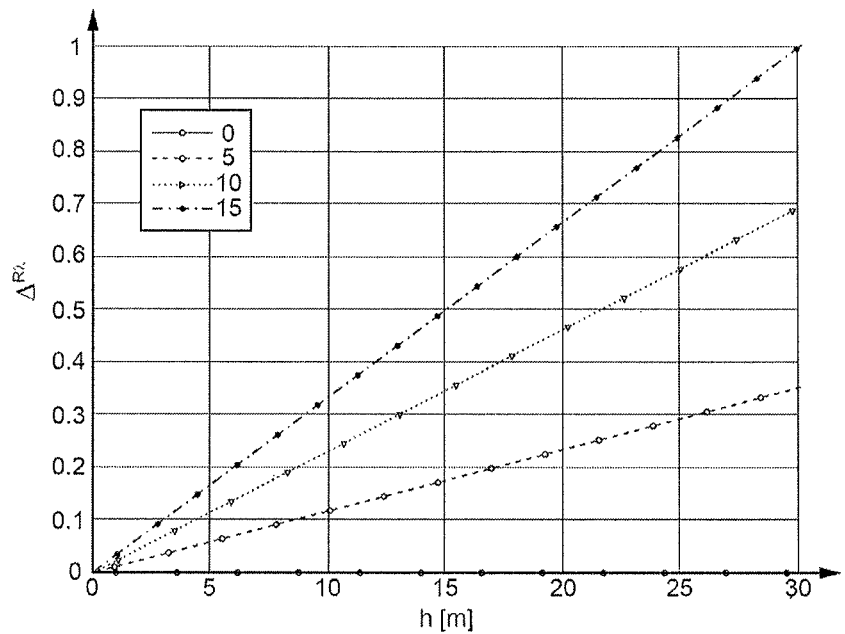
FIGS. 5-10 show graphs obtained by computer simulations carried out by the Applicant in order to validate the present invention.

In fact, in Ref 1 the capacity of azimuth steering of the antenna serves exclusively to maximize the angular overlap between the acquisitions, which may be impaired, for example, by the presence of the wind. In this regard, Ref 1 specifies that:

"the yaw angle of the aircraft can vary widely on different tracks due to different wind condition aloft. This we intend to mitigate by electronically steering a flush mounted antenna to the desired direction" (see, in this regard, lines 7-10 of section II on page 23 of Ref 1);

"Electronic steering of the antenna beam with 1° accuracy over a range of ±20°(goal±45°) in azimuth, so that the repeat pass pointing requirements can be achieved for a wide variety of wind condition aloft" (see, in this regard, lines 8-11 of section II on page 24 of Ref 1); and "Because the electronically scanned antenna has the capability to steer on a pulse-to-pulse basis, three simultaneous SAR images can be generated at three distinct and widely separated squint angles as illustrated above. This will allow the generation of vector deformation maps as well as offer the potential of solving for tropospheric distortions to the deformation signal" (see, in this regard, the lines of comment of FIG. 5 present in section III on page 26 of Ref 1).

The acquisition geometry described and illustrated in Ref 1 is thus in effect completely different from the one used by the present invention, which is, hence, innovative with respect to what is described and illustrated in Ref 1.

Ref 2 specifies (see, in this regard, the first ten lines of section II on page 402 of Ref 2) that: "The basic concept of along-track interferometry is to consider two phase coherent radars deployed along the side of an aircraft . . . . Thus, the two antennas provide two observations of the same surface from the same location at slightly different times". In other words, in Ref 2 there is presupposed the use of the same viewing angles and, hence, of the same squint angles (practically total spectral overlap).

As previously described (see again, in this regard, section "Prior art"), Ref 2 describes a system designed for obtaining acquisitions for interferometric purposes and, in particular, only for estimation of marine currents. Here, instead, the intention is to recall that the present invention regards all interferometric applications, including the estimation of the height of a generic target.

In Ref 2, unlike the present invention that preferably envisages use of a single SAR sensor, a necessary condition is the presence of two pairs of SAR sensors, specifically two SAR sensors that "look" afore of the air platform and two SAR sensors that "look" abaft of the air platform.

Unlike the present invention, Ref 2 envisages interferometric measurements for just the acquisitions made with the same squint angle (the two afore and the two abaft) excluding the possibility of carrying out interferometric measurements between acquisitions made with different squint angles (see again, in this regard, the first ten lines of section II on page 402 of Ref 2).

Moreover, Ref 2 specifies also (see, in this regard, the first six lines of section V on page 411 of Ref 2) that: "This paper has described the principle of operation of an airborne instrument designed to measure sea surface currents in a single pass. It is based on the measurements of two interferograms, one using two antennas pointing forward, the other using two pointing aft. Each provides one radial component of the surface velocity".

The acquisition geometry described and illustrated in Ref 2 is thus in effect completely different from the one used by the present invention, which is, hence, innovative with respect to what is described and illustrated in Ref 2.

Ref 3 specifies (see, in this regard, column 1, lines 19-44, of Ref 3) that: "Interferometric SAR systems on aircrafts have long been used to make height maps of the earth's surface . . . . Interferometric SAR technology takes advantage of the two 2D images from the two antennas. In particular, SAR interferometry employs the phase difference resulting from the relatively small difference in the slant range from a point in the targeted region to the two antennas to extract data for a third dimensional parameter. In another type of SAR system, a pair of space vehicles, such as satellites, may be employed to collect SAR image data for interferometric processing".

As previously described (see again, in this regard, section "Prior art"), Ref 3 describes a system that, unlike the present invention, is constituted by two or more satellites equipped with SAR sensors used for interferometric applications. Here, instead, the intention is to recall that the present invention contemplates also the case of single pass, single air/satellite platform, and single SAR sensor. In particular, Ref 3 specifies (see, in this regard, column 1, lines 12-16, of Ref 3) that: "The present invention relates to a system and method for collecting image data for synthetic aperture radar interferometry (IFSAR), and more particularly to the positioning and operation of a plurality of space vehicles configured to collect image data for IFSAR processing".

Ref 3 describes two types of orbital configuration for the satellite for interferometric applications (see, in this regard, FIGS. 3A, 3B, 4A and 4B of Ref 3). These configurations exploit planetary rotation to create an interferometric baseline; moreover, the acquisitions are made in such a way that they have all the same squint angle. The present invention, instead, uses SAR acquisitions having different squint angles exploiting, in this way, the single acquisition geometry, and not the rotation of the planets, to develop an interferometric baseline. In this regard, Ref 3 specifies that:

"As was mentioned above, the system and method described herein takes advantage of the planetary rotation in order to create a condition to perform interferometry between first and second image data sets for a particular ROI" (see, in this regard, column 6, lines 60-64, of Ref 3); and "In this case the orbit of the vehicle is a polar one . . . . When the trailing space vehicle moving along the aligned orbital track reaches the same position along the orbital track . . . 2 (see, in this regard, column 7, lines 7-21, of Ref 3).

The imposition of the two acquisitions at the same latitude in the case of polar orbit serves to respect the constraint of spectral overlap. In this case, to maximize the overlap, non-squinted acquisitions, i.e., in quasi-zero-Doppler geometry, are used, as illustrated in FIGS. 3A and 3B of Ref 3.

In addition, Ref 3 also specifies (see, in this regard, column 7, lines 48-62, of Ref 3) that: "As can be seen in FIG. 4a . . . . This is performed when the trail space vehicle reaches substantially the same planetary latitude from which the lead space vehicle collected image data. At this point the trail space vehicle 10 emits its electromagnetic pulse and collects the reflected energy".

In the case of non-polar orbit, squinted acquisition is envisaged in order to maximize the spectral overlap. In fact, as illustrated in FIGS. 4A and 4B of Ref 3, the squint, which is identical for the two acquisitions, serves to compensate for the non-orthogonality of the orbit with respect to the rotation of the planet, i.e., to conform to a quasi-zero-Doppler geometry.

The acquisition geometry described and illustrated in Ref 3 is thus in effect completely different from the one used by the present invention, which hence is innovative with respect to what is described and illustrated in Ref 3.

As previously described (see again, in this regard, section "Prior art"), Ref 4 describes a system constituted by a plurality of receivers (at least three) that serve for applications of an MTI (Moving Target Identification) type. Here, instead, the intention is to recall that the present invention contemplates also the case of a single pass, single air/satellite platform, and single SAR sensor and regards, in general, all interferometric applications, including estimation of the height of a generic target. In this regard, Ref 4 specifies that:

"An interferometric moving target radar imaging system includes a plurality of simultaneously operating apertures, receivers and processing channels which together coherently process RF return signals to image a moving vehicle" (see, in this regard, Abstract of Ref 4); and "A radar system which transmits a pulsed waveform from a multi-aperture antenna having at least three apertures and receives backscattered energy from stationary and moving objects illuminated by each of the apertures . . . . " (see, in this regard, claim 1 of Ref 4).

Figure 12:
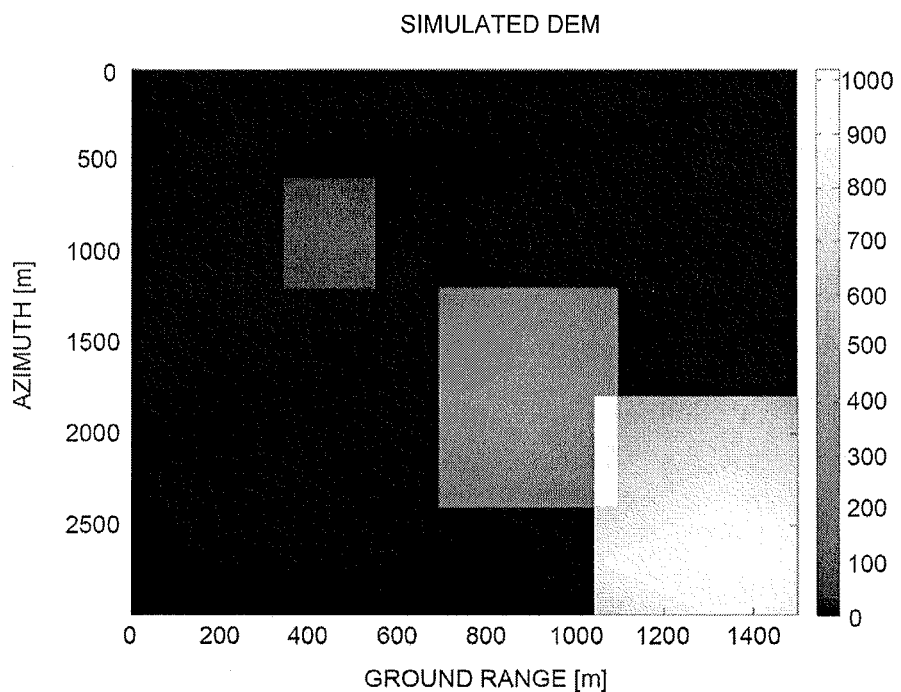

The antenna, as illustrated in FIG. 2 of Ref 4, is divided into N elements arranged along the line of flight, where the distance between the N elements is altogether negligible both with respect to the distance between sensors and target and with respect to the distance covered by the aircraft useful for synthesizing the synthetic aperture. Hence, the N receiving systems use the same squint angle; i.e., as illustrated in FIG. 12 of Ref 4, they have a complete spectral overlap.

The acquisition geometry described and illustrated in Ref 4 is thus in effect completely different from the one used by the present invention, which is hence innovative with respect to what is described and illustrated in Ref 4.

Ref 5 specifies (see, in this regard, pages 5-15 of Ref 5) that:

"An overlap of the Doppler spectra of the 2 interferometric datasets is a prerequisite for achieving data coherence. Spectral mismatch is caused by different antenna squint angles"; and "In single-pass systems, the spectra's overlap typically is guaranteed due to the fact that the antennas are mounted on the platform with identical viewing angles. In repeat-pass systems, however, the overlap depends on the system's capabilities to maintain a certain antenna orientation".

Ref 6 specifies that:

"A satellite SAR can observe the same area from slightly different look angles. This can be done either simultaneously (with two radars mounted on the same platform) or at different times by exploiting repeated orbits of the same satellite.... The distance between the two satellites (or orbits) in the plane perpendicular to the orbit is called the interferometer baseline (see FIG. 2-1) and its projection perpendicular to the slant range is the perpendicular baseline" (see, in this regard, page A-17 of Ref 6); and "Finally, notice that interferometry is possible if there is some spectral overlap" (see, in this regard, page C-103 of Ref 6).

As previously described (see again, in this regard, section "Prior art"), Ref 5 and Ref 6 are tutorials that not only do not contemplate the squinted geometry according to the present invention, but exclude it stating that the geometrical characteristics envisaged do not enable interferometric applications.

Consequently, in the light of the foregoing description, underlying the present invention there is the intuition that it is possible to remove the constraint regarding the spectral overlap since, as explained in detail in what follows, the phenomenon observed in the literature is due to mathematical relations and not to physical characteristics. For this reason, said constraint can be handled. Once it has been established that it is possible to guarantee the coherence between acquisitions that do not present spectral overlap, the Applicant has realized that by carrying out squinted acquisition an interferometric baseline is created. The squinted geometry according to the present invention hence enables SAR acquisitions to be obtained for interferometric purposes via a single air/satellite platform, a single pass, and a single radar sensor equipped with a single antenna, which, in effect, is excluded in the literature (in this regard see, for example, what has been previously described in relation to Ref 3, Ref 5, and Ref 6).

As previously described, the constraint regarding the azimuth spectral overlap imposes that only the areas imaged with common azimuth angles are coherent and hence that only common azimuth angles can be used for interferometric purposes. The hypothesis underlying said constraint is that, on account of the interaction between the physical elements, one and the same scene viewed from different angles responds with a signal having different phase, and, hence, since the number of elementary components is practically unlimited, the phase appears random.

In what follows this constraint will be analysed to prove that the coherence of a scene, and hence the uniformity of the phase response, can be handled also with acquisitions made from different angles. In particular, in what follows it will be shown that this constraint stems from an apparent decorrelation of the signal due to geometrical and processing reasons and not to physical reasons inherent in the target, and hence that said decorrelation can be handled. This intuition stems from the very operation of a SAR: if a scene were to present a behaviour in phase that is a function of the angle, coherent processing, on the basis of focussing of an image, would not function. Instead, not only does it function, but, as the angle of integration increases, the resolution improves both for point-like targets and for distributed targets.

Provided in what follows is a mathematical demonstration on the cause of the apparent decorrelation and a possible strategy to mitigate it and handle it.

Downstream of removal of the quadratic term regarding azimuth focussing, the generic beta response obtained from integration of semi-aperture equal to delta can be written as:

$$S_\Delta(\beta) = \int_{-\Delta}^{\Delta} \sum_i T_i(\theta) \cdot \exp\{j2\pi\beta\theta\} \cdot d\theta \quad (1)$$

with $$T_i(\theta) = A_i \exp\{-j2\pi\theta\theta_i\} \cdot \exp\{-j2\pi\phi_i\} \quad (2)$$

where, $A_i$, $\theta_i$, $\phi_i$ are, respectively the amplitude, the position, and the phase of the generic i-th target.

In the case of single target, Eq. (1) becomes $$S_\Delta(\beta) = A_i \exp\{-j2\pi\varphi_i\} \int_{-\Delta}^{\Delta} \exp\{j2\pi(\beta-\theta_i)\theta\} \cdot d\theta = \quad (3)$$
$$= A_i \exp\{-j2\pi\varphi_i\} \frac{\sin(2\pi\Delta(\beta-\theta_i))}{\pi(\beta-\theta_i)}$$

Dividing the integration into two elements completely separate in azimuth, i.e., completely separate in angle, that is, having zero spectral overlap, we obtain the following equations:

$$S_1(\beta) = A_i \exp\{-j2\pi\varphi_i\} \int_0^{\Delta} \exp\{j2\pi(\beta-\theta_i)\theta\} \cdot d\theta = \quad (4)$$
$$= A_i \exp\{-j2\pi\varphi_i\} \int_{-\frac{\Delta}{2}}^{\frac{\Delta}{2}} \exp\left\{j2\pi(\beta-\theta_i)\left(\theta' + \frac{\Delta}{2}\right)\right\} \cdot d\theta' =$$
$$= A_i \exp\{-j2\pi\varphi_i\} \exp\left\{j2\pi(\beta-\theta_i)\frac{\Delta}{2}\right\} \frac{\sin(\pi\Delta(\beta-\theta_i))}{\pi(\beta-\theta_i)}$$

and $$S_2(\beta) = A_i \exp\{-j2\pi\varphi_i\} \int_{-\Delta}^{0} \exp\{j2\pi(\beta-\theta_i)\theta\} \cdot d\theta = \quad (5)$$
$$= A_i \exp\{-j2\pi\varphi_i\} \exp\left\{-j2\pi(\beta-\theta_i)\frac{\Delta}{2}\right\} \frac{\sin(\pi\Delta(\beta-\theta_i))}{\pi(\beta-\theta_i)}$$

The two acquisitions ($S_1$ and $S_2$) have for each point a different phase, and consequently the two images would appear completely incoherent.

Comparing Eq. (4) with Eq. (5) we can state that $$S_1(\beta) + S_2(\beta) = S_\Delta(\beta)$$

$$S_1(\theta_i) = S_2(\theta_i)$$

$$S_1(\theta_i = \alpha) = S_2(\theta_i, \alpha) \quad (6)$$

Consequently, $\forall \alpha$ we have $$\int_{\theta_i-\alpha}^{\theta_i+\alpha} S_1(\beta) d\beta = \int_{\theta_i-\alpha}^{\theta_i+\alpha} S_2(\beta) d\beta \quad (7)$$

Moreover, if $$\alpha_1 > \frac{1}{2\Delta} \text{ and } \alpha_2 > \frac{1}{2\Delta},$$

using the property of the impulsive response (in this case a sinc) we can state that $$\int_{\theta_i-\alpha_1}^{\theta_i+\alpha_2} S_1(\beta)\,d\beta \approx \int_{\theta_i-\alpha_1}^{\theta_i+\alpha_2} S_2(\beta)\,d\beta \qquad (8)$$

In the case of distributed target, which can be represented by a multitude of elementary targets, the two acquisitions ($S_1$ and $S_2$) can be written as $$S_1(\beta) = \sum_i A_i \exp\{-j2\pi\varphi_i\}\exp\left\{j2\pi(\beta-\theta_i)\frac{\Delta}{2}\right\}\frac{\sin(\pi\Delta(\beta-\theta_i))}{\pi(\beta-\theta_i)}$$

$$S_2(\beta) = \sum_i A_i \exp\{-j2\pi\varphi_i\}\exp\left\{-j2\pi(\beta-\theta_i)\frac{\Delta}{2}\right\}\frac{\sin(\pi\Delta(\beta-\theta_i))}{\pi(\beta-\theta_i)} \qquad (9)$$

Setting $\theta_i^m = \text{Min}(\theta_i)$ and $\theta_i^M = \text{Max}(\theta_i)$ we obtain $$\forall\, \alpha_1, \alpha_2:\ \alpha_1 < \theta_i^m - \frac{1}{2\Delta} \text{ and } \alpha_2 < \theta_i^M + \frac{1}{2\Delta} \qquad (10)$$

$$\int_{\alpha_1}^{\alpha_2} S_1(\beta)\,d\beta =$$

$$\int_{\alpha_1}^{\alpha_2} \sum_i A_i \exp\{-j2\pi\varphi_i\}\exp\left\{j2\pi(\beta-\theta_i)\frac{\Delta}{2}\right\}\frac{\sin(\pi\Delta(\beta-\theta_i))}{\pi(\beta-\theta_i)}\,d\beta ==$$

$$\sum_i A_i \exp\{-j2\pi\varphi_i\}\int_{\alpha_1}^{\alpha_2}\exp\left\{j2\pi(\beta-\theta_i)\frac{\Delta}{2}\right\}$$

$$\frac{\sin(\pi\Delta(\beta-\theta_i))}{\pi(\beta-\theta_i)}\,d\beta = \approx \int_{\alpha_1}^{\alpha_2} S_2(\beta)\,d\beta$$

Eqs. (4), (5) and (9) show that for each position beta, and hence for each pixel, the phase of the response of a given area is a function of a multitude of targets positioned in the neighbourhood of the position beta. This function is correlated to the angles of integration used for focussing, and, in the case of no angular (or spectral) overlap, the phase of the two images will be completely different.

Hence, the area around the position beta (and consequently in the entire image) will appear completely incoherent.

As previously anticipated, said equations bring out the fact that the incoherence is due exclusively to causes of a geometrical nature and not directly correlated to the scene.

Eqs. (8) and (10) show how it is possible to obtain coherent phase information from the two (or in general from the various) acquisitions obtained without spectral overlap. In fact, the two Eqs. (8) and (10) show how an area as a whole (which can be considered, in effect, an equivalent target) presents the same response ($S_1 \approx S_2$).

Hence, an area acquired from completely different angles is coherent. The dimension of this area and the edge effect, due to the impossibility of perfectly isolating homogeneous areas, will be a function of the variability of the intensity of the signal; in the case of isolated target, the dimensions of this area can be considered as a resolution cell.

In order to validate the present invention, the Applicant has conducted various computer simulations aimed at assessing the relation between the height of the target and the difference of the paths as a function of the geometry in terms of baseline, roll, and pitch, considering both a plane geometry and an ellipsoidal geometry.

The computer simulations conducted by the Applicant have shown that also for the squinted geometry, as for the conventional quasi-zero-Doppler geometry, there exists a linear dependence between the height of the target and the difference of the sensor-target paths. Said dependence is a function of the mean squint angle, of the angle of roll, and of the baseline, and in the case of zero mean squint angle is close to zero.

In this regard, FIG. 5 shows a first graph that represents the difference of path $\Delta R$ normalized with respect to the wavelength $\lambda$ of the radar signals used as a function of the height h of the target and of the mean squint angle. In particular, the graph of FIG. 5 has been obtained assuming a baseline of 2 km, an angle of roll of 30°, and a height of the satellite that carries the SAR sensor of 619 km.

Figure 6:
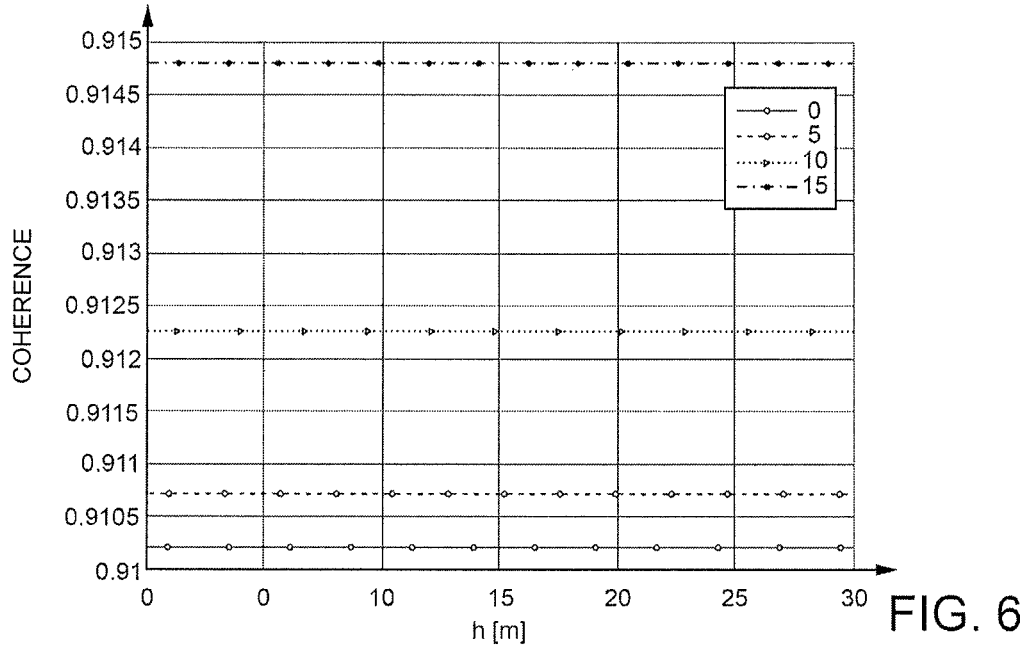

Moreover, FIG. 6 shows a second graph that represents the coherence as a function of the height h of the target and of the mean squint angle. Also the graph of FIG. 6 has been obtained assuming a baseline of 2 km, an angle of roll of 30° and a height of the satellite of 619 km. From the graph of FIG. 6 it may be noted how the coherence does not change as a function of the height of the target.

The accuracy of the height of the DEM is hence a percentage of the ambiguity height. Said percentage, which is typically lower than one tenth, is principally a function of the coherence.

Figure 7:
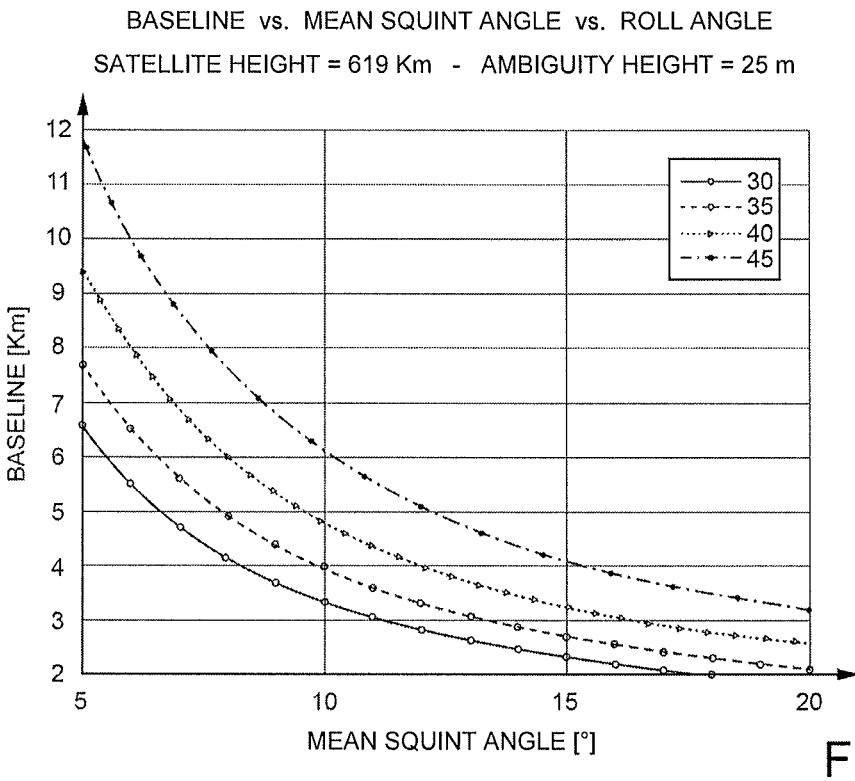

FIG. 7 shows a third graph that represents the baseline as a function of the mean squint angle and of the angle of roll. The graph of FIG. 7 has been obtained assuming a height of the satellite of 619 km and an ambiguity height of 25 m, and hence a vertical accuracy in the region of a few meters. From the graph of FIG. 7 it may be noted how the baseline decreases as the mean squint angle increases.

Figure 8:
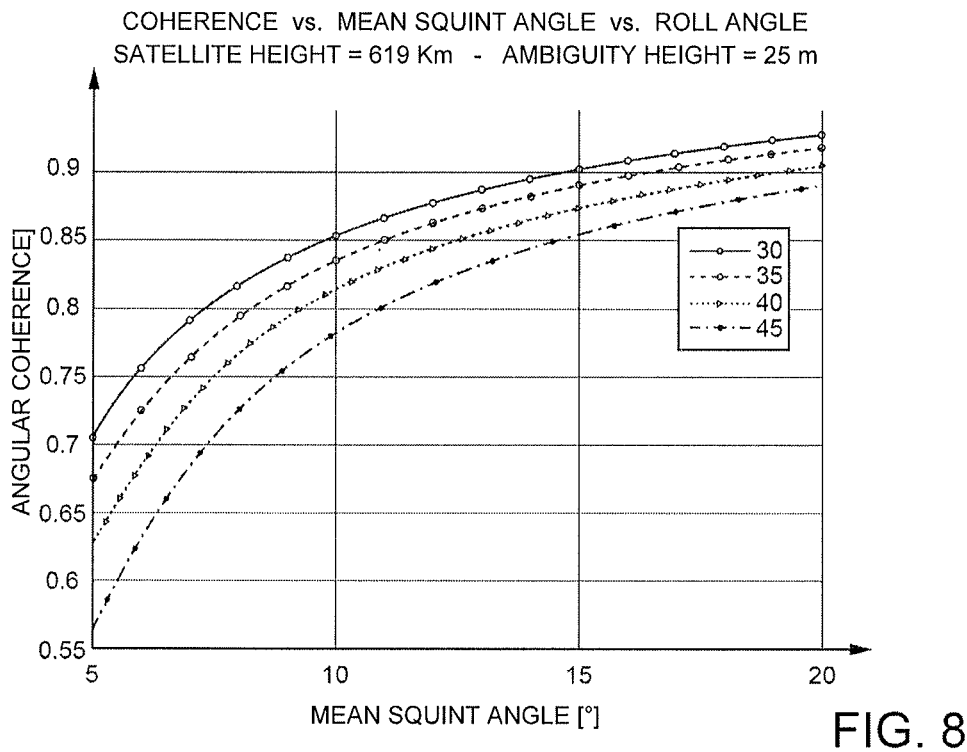

FIG. 8 shows a fourth graph that represents the coherence as a function of the mean squint angle and of the angle of roll. Also the graph of FIG. 8 has been obtained assuming a height of the satellite of 619 km and an ambiguity height of 25 m, and hence a vertical accuracy in the region of a few meters. From the graph of FIG. 8 it may be noted how the coherence increases as the mean squint angle increases and as the angle of roll decreases.

Figure 9:
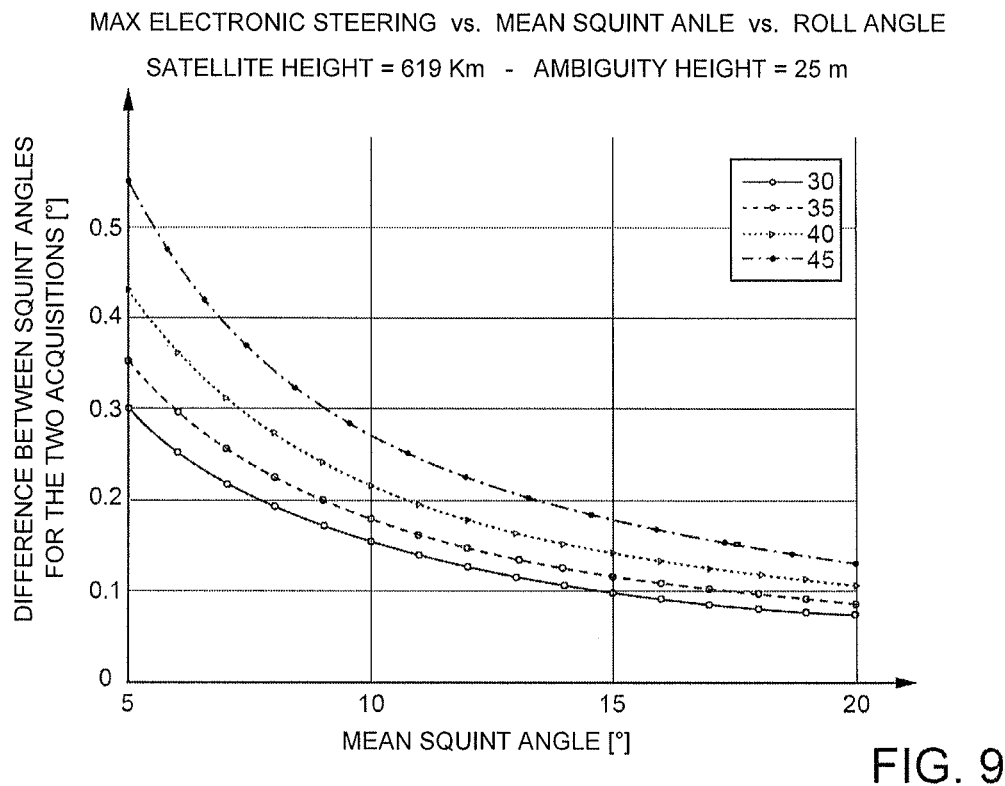

FIG. 9 shows a fifth graph that represents the difference between the squint angles corresponding to the two SAR acquisitions as a function of the mean squint angle and of the angle of roll. Also the graph of FIG. 9 has been obtained assuming a height of the satellite of 619 km and an ambiguity height of 25 m, and hence a vertical accuracy in the region of a few meters. From the graph of FIG. 9 it may be noted how the difference between the squint angles corresponding to the two SAR acquisitions increases as the mean squint angle decreases.

Figure 10:
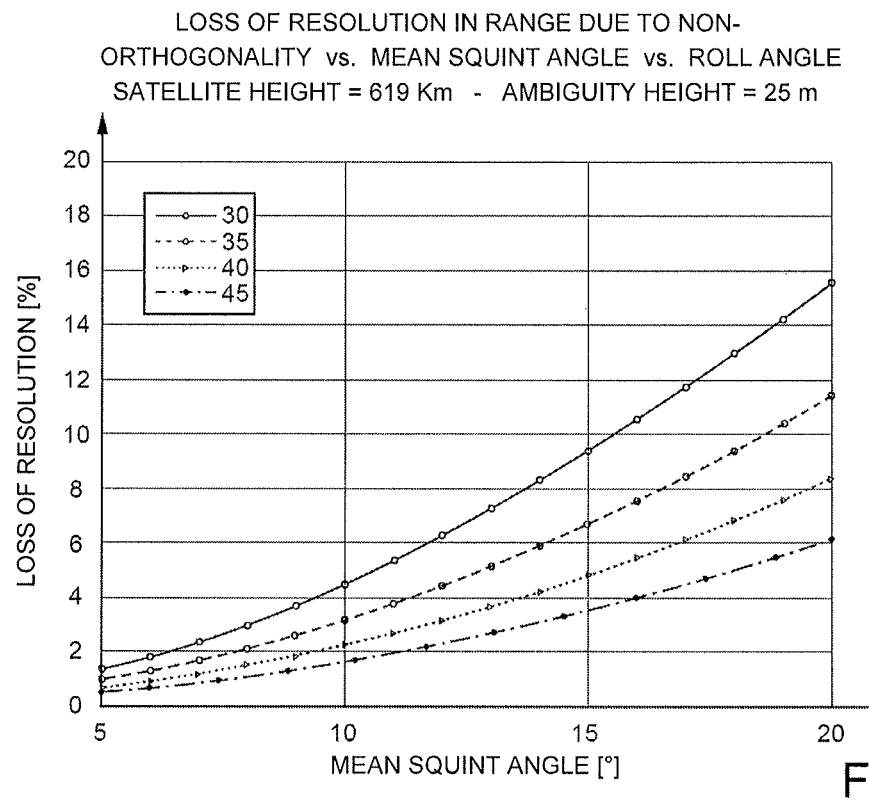

Finally, FIG. 10 shows a sixth graph that represents the loss of resolution due to the non-orthogonality between the directions of ground range and azimuth as a function of the mean squint angle and of the angle of roll. Also the graph of FIG. 10 has been obtained assuming a height of the satellite of 619 km and an ambiguity height of 25 m, and hence a vertical accuracy in the region of a few meters. From the graph of FIG. 10 it may be noted how the loss of resolution due to the non-orthogonality between the directions of ground range and azimuth increases as the mean squint angle increases.

From the graphs shown in FIGS. 5-10 it emerges that the best operating region for the average squint angle is between 10° and 15°; in said range, in fact, there are obtained altogether acceptable values both of coherence and of loss of resolution due to non-orthogonality, in particular values of coherence greater than 0.8 and values of loss of resolution due to non-orthogonality lower than 0.2.

Figure 11:
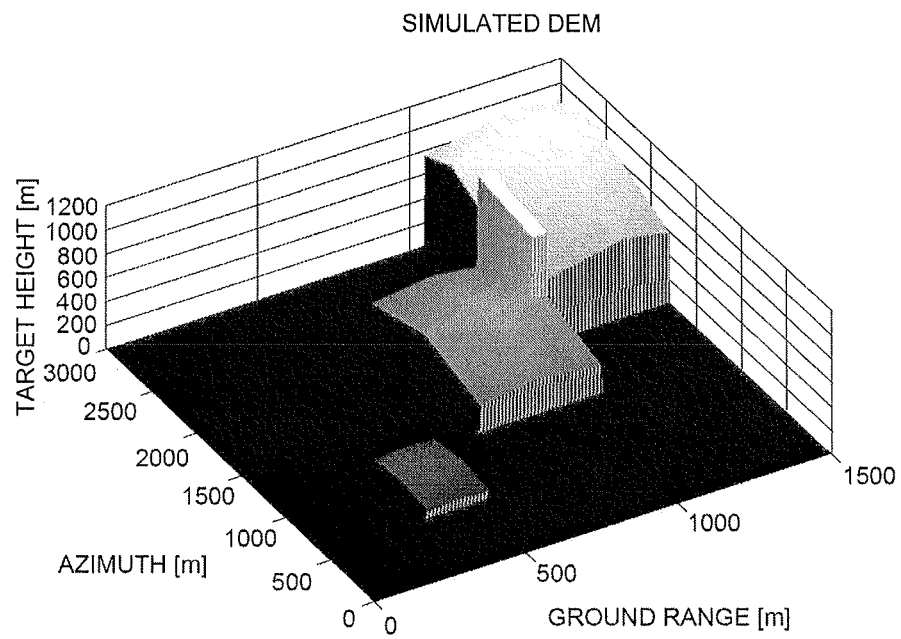
FIGS. 11, 12 and 13 show a height profile simulated on the computer (FIGS. 11 and 12) and the corresponding interferogram (FIG. 13) obtained by simulating on the computer the acquisition of two SAR images according to the present invention.
Figure 13:
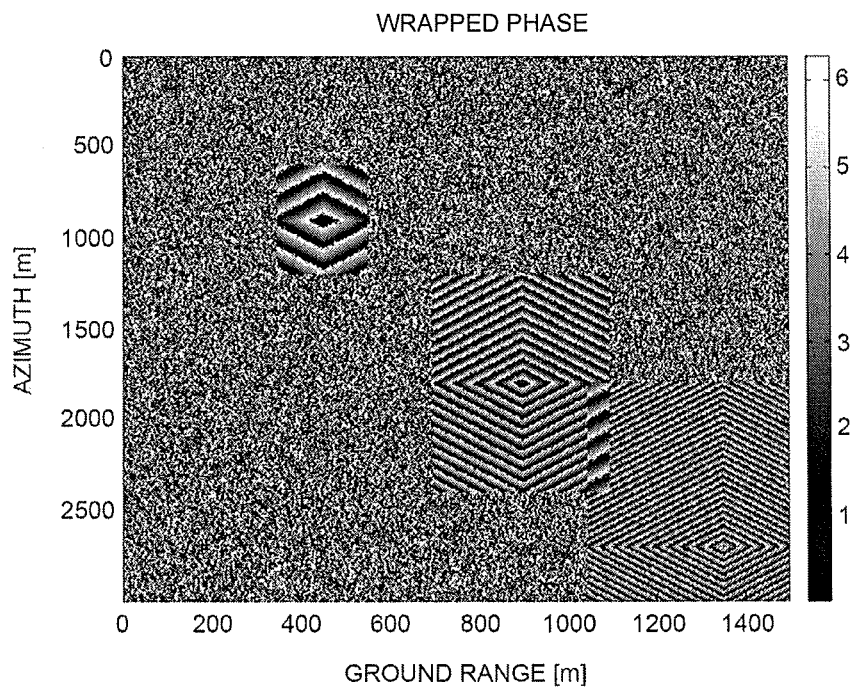

FIGS. 11, 12 and 13 show a profile of height simulated on the computer (represented in FIGS. 11 and 12 via greyscale; in particular, FIG. 11 shows a three-dimensional view thereof) and the corresponding interferogram obtained by simulating on the computer the acquisition of two SAR images according to the present invention. In particular, in the interferogram of FIG. 13 the phase difference is represented via greyscale. In detail, the interferogram of FIG. 13 has been obtained simulating on the computer a mean squint angle of 15°, a baseline of 2.5 km, an angle of roll of 30°, a correlation coefficient of 0.9, and a resolution in ground range of 1 m.

FIGS. 14-18 are schematic illustrations of five different strategies of acquisition of SAR images according to respective preferred embodiments of the present invention.

In particular, FIGS. 14-18 show a satellite 10 that moves in a flight direction $\vec{d}$ and is equipped with a SAR sensor (not shown for simplicity in FIGS. 14-18) that acquires pairs of SAR images of one and the same area of interest A using the squinted-geometry acquisition according to the present invention. Preferably, the antenna used by the SAR sensor is an electronically steerable beam antenna mounted on the satellite 10 in such a way as to be able to look forward or aft. As described previously, said configuration can be obtained using also the movement of pitch of the satellite 10.

Figure 14:
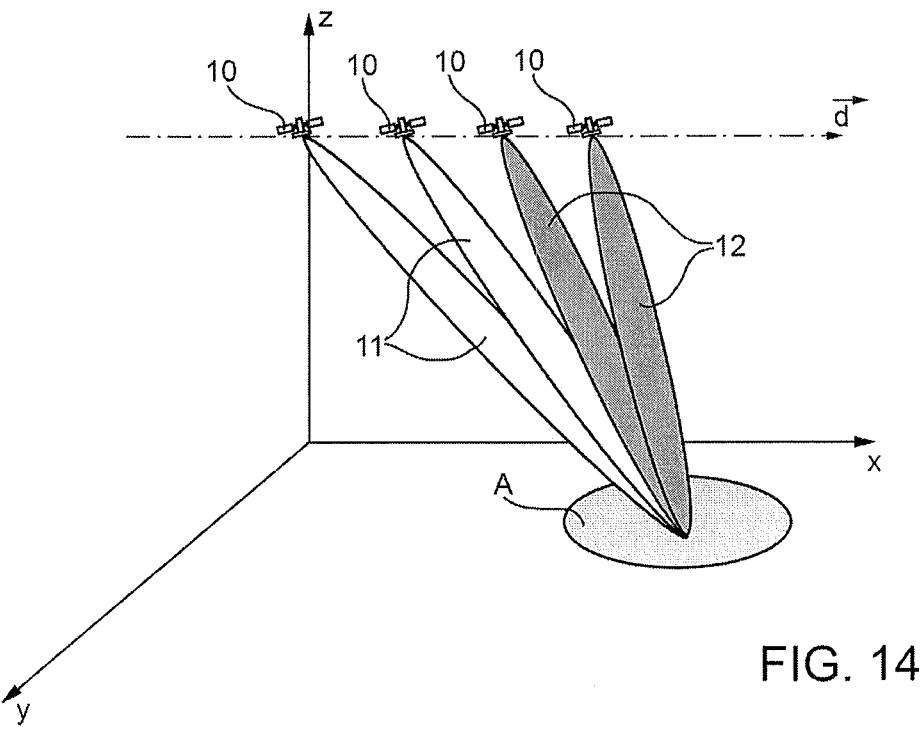
FIGS. 14-18 are schematic illustrations of five different strategies of acquisition of SAR images according to respective preferred embodiments of the present invention.
Figure 15:
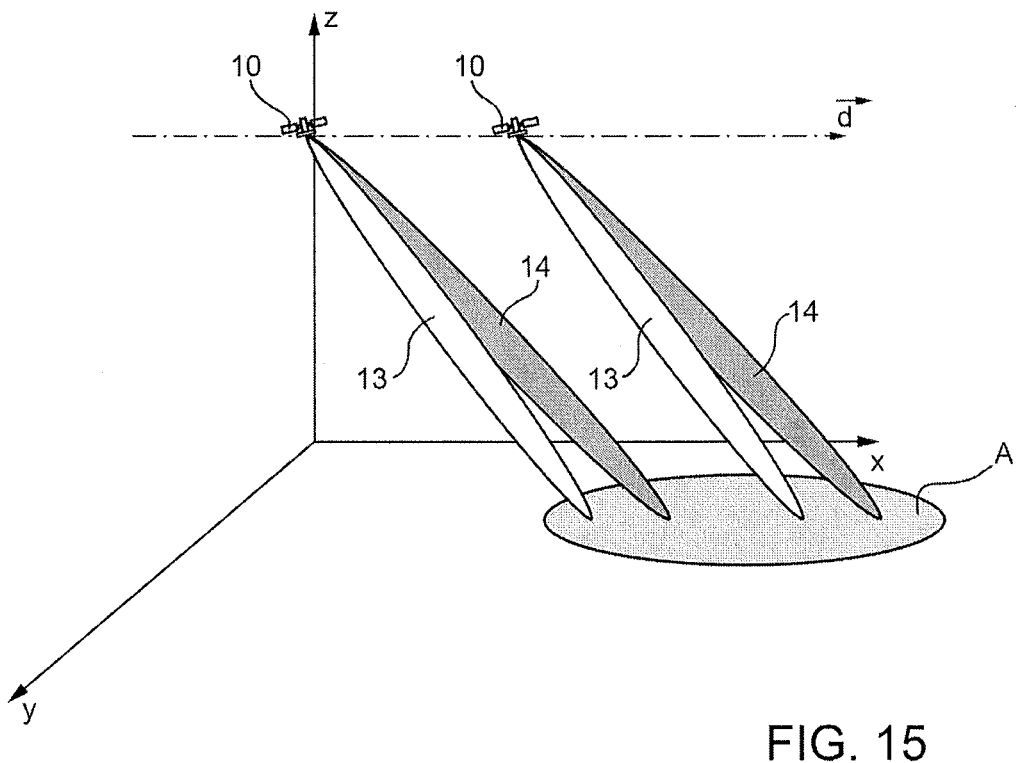
Figure 16:
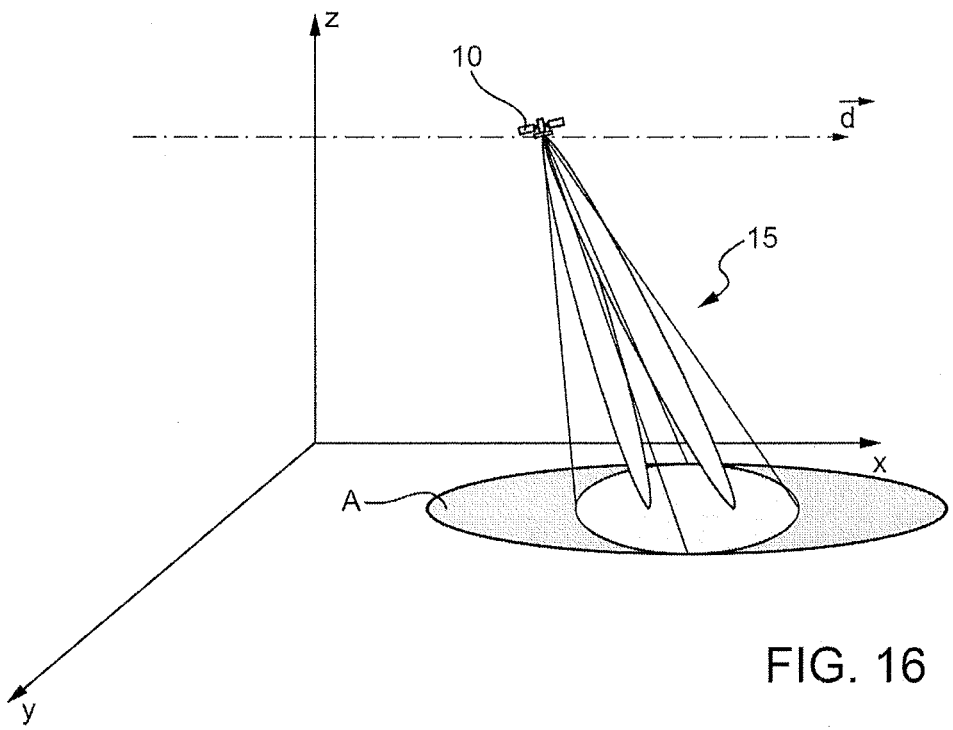
Figure 17:
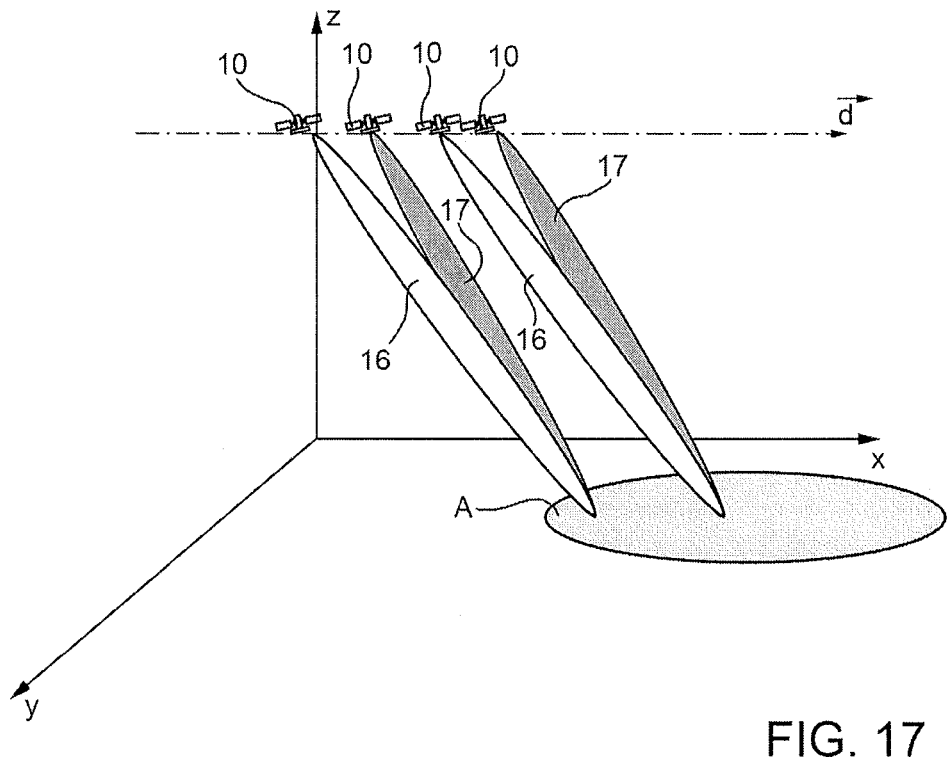
Figure 18:
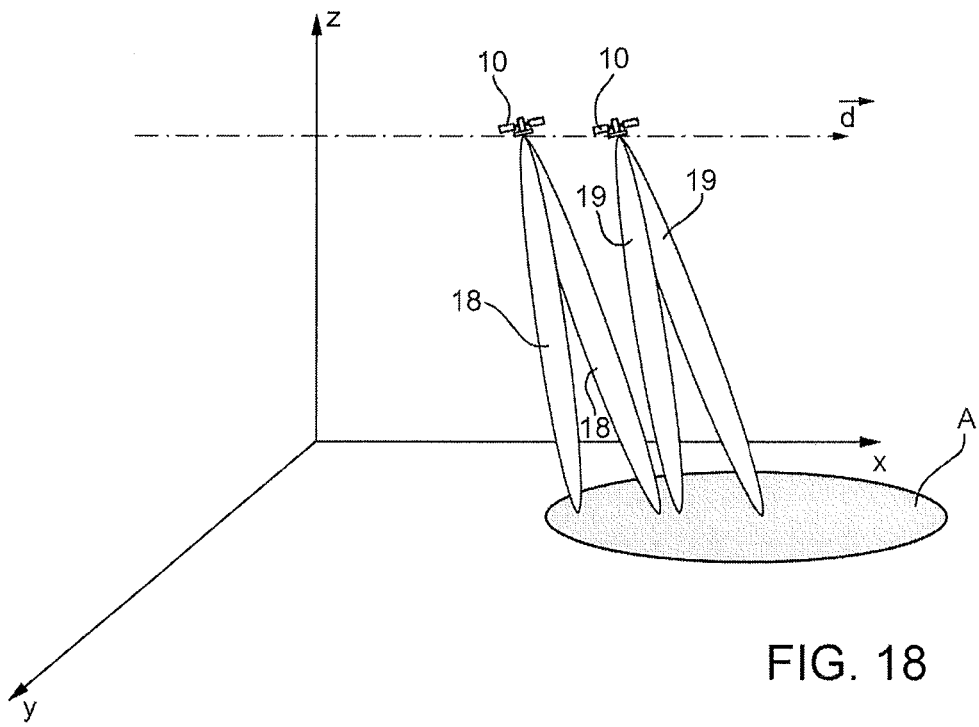

In detail,
FIG. 14 is a schematic illustration of two pairs of squinted acquisitions of SAR images of the area A obtained via a first operating mode referred to as "Squint Spot" (in FIG. 14 the two pairs of squinted acquisitions are designated, respectively, by 11 and 12);
FIG. 15 is a schematic illustration of two pairs of squinted acquisitions of SAR images of the area A obtained via a second operating mode referred to as "Double Squint Strip" (in FIG. 15 the two pairs of squinted acquisitions are designated, respectively, by 13 and 14);
FIG. 16 is a schematic illustration of a markedly squinted acquisition obtained via a third operating mode referred to as "Extended Strip Squint" (in FIG. 16 the markedly squinted acquisition is designated by 15);
FIG. 17 is a schematic illustration of two pairs of squinted acquisitions of SAR images of the area A obtained via a fourth operating mode referred to as "StripScan Squint" (in FIG. 17 the two pairs of squinted acquisitions are designated, respectively, by 16 and 17); and
FIG. 18 is a schematic illustration of two pairs of squinted acquisitions of SAR images of the area A obtained via a fifth operating mode referred to as "StripTops Squint" (in FIG. 18 the two pairs of squinted acquisitions are designated, respectively, by 18 and 19).

In still further detail, the first operating mode referred to as "Squint Spot" (represented schematically in FIG. 14) envisages a markedly squinted spot acquisition. The two SAR images can be obtained by processing two parts of the acquisition separately.

The second operating mode referred to as "Double Squint Strip" (represented schematically in FIG. 15) envisages a markedly squinted strip acquisition of an interleaved type, dedicating in an alternating way the PRI (Pulse Repetition Interval) to the different angles, thus obtaining one and the same scene from different angles.

The third operating mode referred to as "Extended Strip Squint" (represented schematically in FIG. 16) envisages a markedly squinted strip acquisition using a very extensive beam and synthesizing via processing on the ground of two separate SAR images having different squint values, thus obtaining one and the same scene from different angles.

The fourth operating mode referred to as "StripScan Squint" (represented schematically in FIG. 17) envisages markedly squinted stripmap acquisitions, by varying the angle in burst mode, thus obtaining one and the same scene from different angles.

Finally, the fifth operating mode referred to as "StripTops Squint" (represented schematically in FIG. 18) envisages markedly squinted TOPS acquisitions of one and the same scene in separate bursts, thus obtaining one and the same scene from different angles.

From the foregoing description, the advantages of the present invention may be immediately appreciated.

In particular, it should be emphasized that, unlike the techniques currently exploited that envisage the use of multiple passes over one and the same area or the simultaneous use of a number of SAR sensors positioned on one or more platforms, the present invention enables, instead, generation of a DEM using just one SAR sensor that is airborne by just one satellite/aircraft and that observes the area of interest with just one pass of the satellite/aircraft and using just one antenna. Consequently, it is clear that the present invention enables reduction of the development and operating costs for the generation of high-accuracy three-dimensional topographic maps and/or DEMs via SAR remote sensing from aircraft and/or satellite.

Moreover, the present invention not only optimizes the economic aspects and the aspects of performance, but also introduces a greater flexibility of use, enabling the choice of the baseline according to the scene to be reproduced.

Presented schematically in the table below is a synthetic comparison between costs, performance, and flexibility of the present invention and of the three main techniques currently used for generating three-dimensional topographic maps and/or DEMs via satellite SAR remote sensing.

| TECHNIQUE | COST | PERFORMANCE | FLEXIBILITY |
|---|---|---|---|
| Present invention | Low | High | High |
| Single satellite double antenna | High (distance of tens of metres between two antennas) | Medium (reduced baseline) | Low (fixed baseline) |
| Double satellite | High (two satellites, flight in formation) | High | Low (variable baseline but with constraints imposed by orbital design) |
| Single satellite double pass | Low | Low (High temporal decorrelation) | Medium (baseline value constrained by orbital control) |

In summary, the present invention enables the generation of DEMs with a performance altogether similar to the performance of currently available systems, which envisage the use of SAR sensors, but presents development and operating costs that are considerably reduced, as well as a higher degree of flexibility.

Finally, it is clear that various modifications may be made to the present invention, all of which fall within the sphere of protection of the invention as defined in the annexed claims.

What is claimed is:

1. A method for acquiring SAR images for interferometric processing, comprising:
   acquiring, by one airborne SAR sensor, SAR images of one and the same area with an acquisition geometry such that to enable interferometric processing of said SAR images;
   said method being characterized by an acquisition geometry in which each SAR image of the area is acquired in a respective direction of acquisition that defines a respective squint angle with respect to the direction of flight and in which the squint angles are such that to determine a mean squint angle different from zero;
   wherein the SAR images are acquired by only one SAR sensor that is airborne by an air/satellite platform, uses only one antenna and acquires the SAR images in only one pass of the air/satellite platform.

2. The method according to claim 1, wherein the mean squint angle is equal to, or greater than, three degrees.

3. The method according to claim 1, wherein for each SAR image acquired the respective direction of acquisition is obtained by:
   electronically steering the directivity of the antenna of the SAR sensor used for acquiring said SAR image; and/or
   imposing a movement of pitch and/or yaw on said SAR sensor.

4. The method according to claim 1, wherein acquiring a SAR image of the area comprises:
   transmitting radar signals so as to illuminate said area with said radar signals;
   receiving in the respective direction of acquisition the radar signals back-scattered from said area; and
   processing the radar signals received so as to generate a SAR image of said area.

5. The method of claim 1 further comprising:
   computing a height of a target present in the area by an interferometric processing of the acquired SAR images of said area, said interferometric processing being based on the acquisition geometry with which said SAR images have been acquired.

6. The method of claim 1 further comprising:
   computing a digital elevation model of the area by an interferometric processing of the acquired SAR images of said area, said interferometric processing being based on the acquisition geometry with which said SAR images have been acquired.

7. The method of claim 1 further comprising:
   computing an interferogram on the basis of the acquired SAR images of the area.

8. The method of claim 1 further comprising:
   computing a coherence map on the basis of the acquired SAR images of the area.

9. A SAR remote sensing system comprising the air/satellite platform and the SAR sensor installed on board said air/satellite platform, the system being configured to implement the SAR image acquisition method claimed in claim 1.

10. The method of claim 1 further comprising:
    providing a non-transitory computer readable medium having stored thereon a computer program capable of being executed by a processor, which when executed by a processor causes the processor to:
    (i) carry out an interferometric processing of the acquired SAR images of the area, said interferometric processing being based on the acquisition geometry with which said SAR images have been acquired; and
    (ii) compute a height of a target present in said area on the basis of the interferometric processing carried out.

11. The method of claim 1 further comprising:
    providing a non-transitory computer readable medium having stored thereon a computer program capable of being executed by a processor, which when executed by a processor causes the processor to:
    (i) carry out an interferometric processing of the acquired SAR images of the area, said interferometric processing being based on the acquisition geometry with which said SAR images have been acquired; and
    (ii) compute a digital elevation model of said area on the basis of the interferometric processing carried out.

12. The method of claim 1 further comprising:
    providing a non-transitory computer readable medium having stored thereon a computer program capable of being executed by a processor, which when executed by a processor causes the processor to compute an interferogram on the basis of the acquired SAR images of the area.

13. The method of claim 1 further comprising:
    providing a non-transitory computer readable medium having stored thereon a computer program capable of being executed by a processor, which when executed by a processor causes the processor to compute a coherence map on the basis of the acquired SAR images of the area.

* * * * *